Nov. 14, 1950            F. B. HARVUOT            2,530,198

FILTERING APPARATUS

Filed July 31, 1944                                    6 Sheets-Sheet 1

*Fig.1*

INVENTOR.
FRANK B. HARVUOT
BY Edmund W. E. Kamm

Fig. 2

Nov. 14, 1950     F. B. HARVUOT     2,530,198
FILTERING APPARATUS Filed July 31, 1944     6 Sheets-Sheet 3

Frank B. Harvuot
INVENTOR.
BY Edmund W. C. Kamm

Nov. 14, 1950 — F. B. HARVUOT — 2,530,198
FILTERING APPARATUS
Filed July 31, 1944 — 6 Sheets-Sheet 4

FRANK B. HARVUOT
INVENTOR.

Nov. 14, 1950  F. B. HARVUOT  2,530,198
FILTERING APPARATUS
Filed July 31, 1944  6 Sheets-Sheet 5

Fig. 6.

FRANK B. HARVUOT
INVENTOR.

BY Edmund W. E. Kamm

Nov. 14, 1950  F. B. HARVUOT  2,530,198
FILTERING APPARATUS

Filed July 31, 1944  6 Sheets-Sheet 6

FRANK B. HARVUOT
INVENTOR.
BY Edmund W. E. Kamm

Patented Nov. 14, 1950

2,530,198

UNITED STATES PATENT OFFICE 2,530,198

FILTERING APPARATUS

Frank B. Harvuot, Fort Wayne, Ind., assignor to Bowser, Inc., Fort Wayne, Ind., a corporation of Indiana Application July 31, 1944, Serial No. 547,446

8 Claims. (Cl. 210—179)

This invention relates to an apparatus for filtering oils such as Diesel crankcase lube oils. More specifically, it relates to filtering apparatus having a plurality of independent filter elements which may at will be removed individually from the flow path of the incoming liquid so that the length of the overall filtering cycle will be increased.

In prior filtration practice, the brevity of the filtration cycle resulting from the clogging of the filter element has proved extremely aggravating and inconvenient. The resultant interruption of operation has been costly. The present invention provides a simple solution to overcome this inherent difficulty.

One object of the invention is to provide a filtering apparatus in which the filtration cycle will be substantially lengthened.

Another object of the invention is to provide filtering apparatus wherein a high rate of filtration is maintained.

Yet another object of the invention is to provide a plurality of filtering elements in a casing, and means for forcing fluid to be filtered through only a predetermined member of such elements.

A further object of the invention is to provide filtering apparatus wherein filter elements may be individually removed at will from the flow path to present a new initial filtering surface.

It is another object of the invention to provide filtering apparatus wherein adequate temperature and pressure control of the liquid are maintained.

Yet another object of the invention is to provide filtering apparatus, wherein substantially edge-type filtration is utilized.

It is a still further object of the invention to provide filtering apparatus wherein improper operation is immediately indicated.

Another object of the invention is to provide a filter element formed of absorptive paper wound into a roll, which both filters and dehydrates the oil.

Yet a further object of the invention is to provide a plurality of such filter elements or rolls in series in a magazine with separators therebetween to facilitate separation.

Another object of the invention is to provide a filter element of absorptive paper ribbon wound into a relatively flat roll of large diameter relative to its thickness so that it resembles a disc rather than a roll.

A further object of the invention is to provide filtering apparatus which may be quickly and easily dismantled and reassembled.

These and other objects will become apparent from a study of this specification and the drawings which are attached hereto, form a part hereof, and in which.

Figure 1:
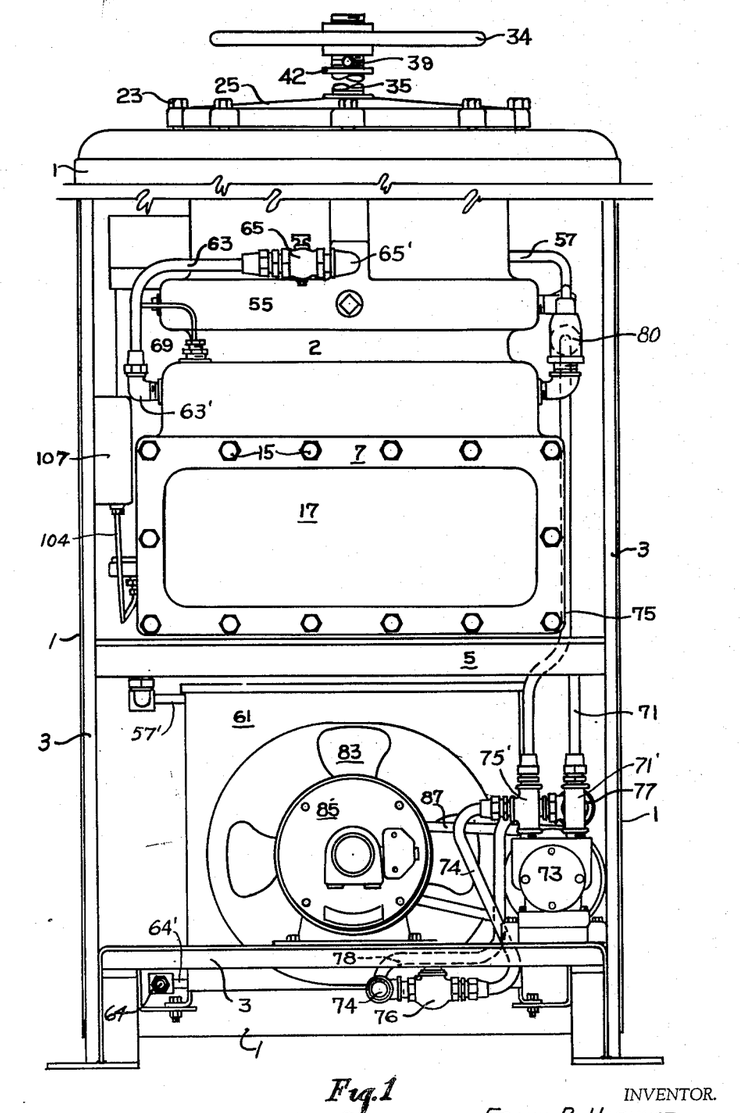
Figure 1 is a rear elevation of the filter with the outer casing removed to show the filter casing, the pump, fan, and piping.
Figure 2:
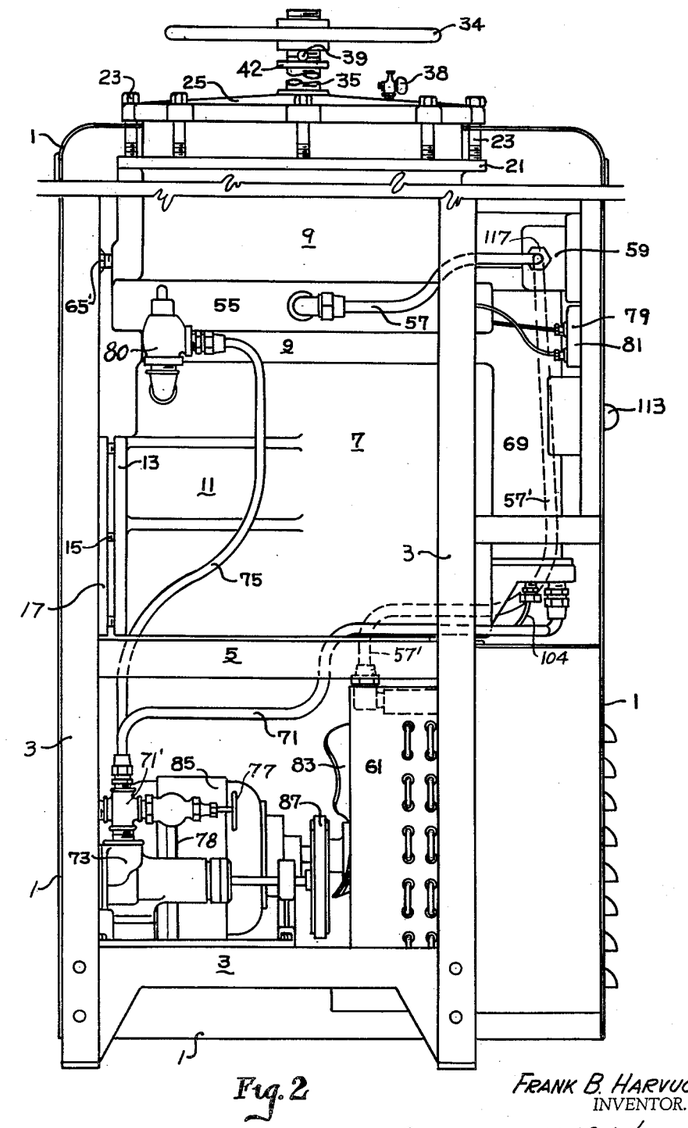
Figure 2 is a side elevation of the unit viewed from the right of Figure 1, but with the housing removed.
Figure 3:
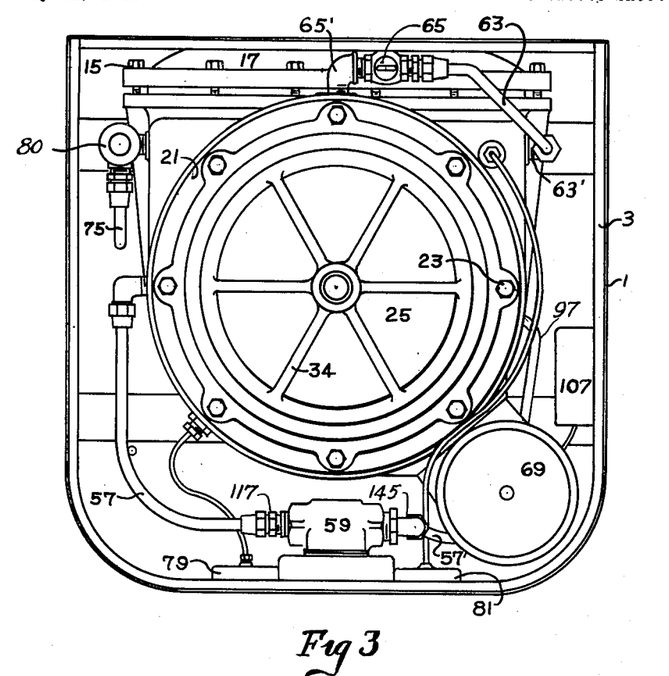
Figure 3 is a top view of the apparatus with the housing removed, showing the hand wheel, heater, flow indicator, and other parts.
Figure 4:
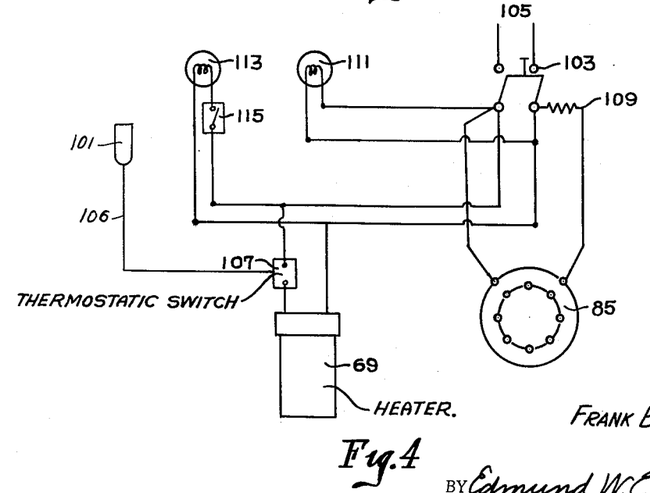
Figure 4 is a schematic wiring diagram of the electrical system employed in the apparatus.

Referring now to Figures 1, 2, 3, and 6, the external casing or housing 1 of the apparatus is suitably supported on the frame, which is generally designated by the numeral 3. Disposed in substantially the upper half of the structure and supported by cross-supports 5 of the frame 3 is the body of the filter, generally designated as 7. The body 7 of the filter comprises an upper cylindrical portion 9 which forms the actual filtration chamber and the sump 11, which latter portion is partially cylindrical but extends laterally in one direction as shown in Fig. 3. The bottom 10 of this lateral portion slopes toward a rectangular cleanout opening 12, the periphery of which is flanged as at 13. The cylinder opens directly into the sump and the opening is substantially unrestricted. The flanges 13 have threaded holes adapted to receive screws 15 which serve to hold the gasket 14 of the cover plate 17 in fluid tight engagement with the flanged portion 13. A drain plug 19 is disposed in the bottom of the sump 11.

The filtration chamber 9 is open at its upper end and has an outwardly extending flange 21. This flange 21 has threaded holes which receive screws 23 which pass through the cover plate 25.

The screws hold the gasket 26 of the cover plate in sealing relation against the end of the chamber 9.

Figures 5, 10:
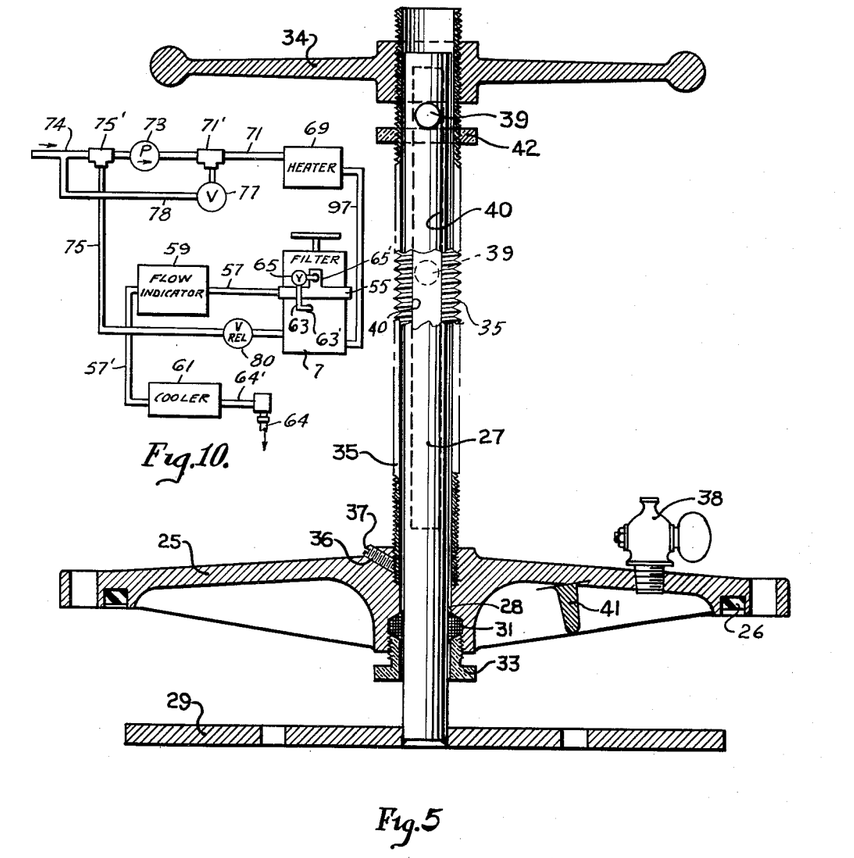
Figure 5 is a sectional view of the ejector mechanism and the cover plate.
Figure 10 is a diagrammatic view of the liquid circuit.

As shown in section in Figure 5, the cover plate 25 has a central bore 28 to accommodate a rod 27 to whose lower end is suitably fastened a pressure plate 29. The lower end of the bore is constructed to receive a packing 31 and a packing gland 33, to effectively seal the chamber from the atmosphere. The upper end of the bore is counterbored and threaded to receive a slotted tube 35 which loosely surrounds the rod 27. A threaded hole 36 is disposed angularly in the cover plate 25 to receive a screw 37 which engages the tube 35 and prohibits its rotation in the cover plate. The tube 35 is externally threaded throughout its whole length to receive a hand wheel 34 which is adapted to bear upon the top side of pins 39 which are fixed in and extend transversely of the rod 27 and extend through the diametrically opposed, longitudinal slots 40 in the tube 35 and project out under the hub of the hand wheel for operation thereby. A nut 42 also threadedly engages the tube 35 and bears against the bottom side of the pins, so as to hold the rod 27 in the position to which it is adjusted by the hand wheel 34. It will be obvious that turning the hand wheel 34 in one direction will exert downward force on the pins 39, rod 27, plate 29 and the filter elements (described below) which will be engaged by the pressure plate 29. Nut 42 may be used to raise the rod 27 after the handwheel has been backed away from the pins. The cross-sectional view of a rib of the cover plate is indicated by the numeral 41. Suitably disposed in the cover plate is a manual air release valve 38.

Figure 6:
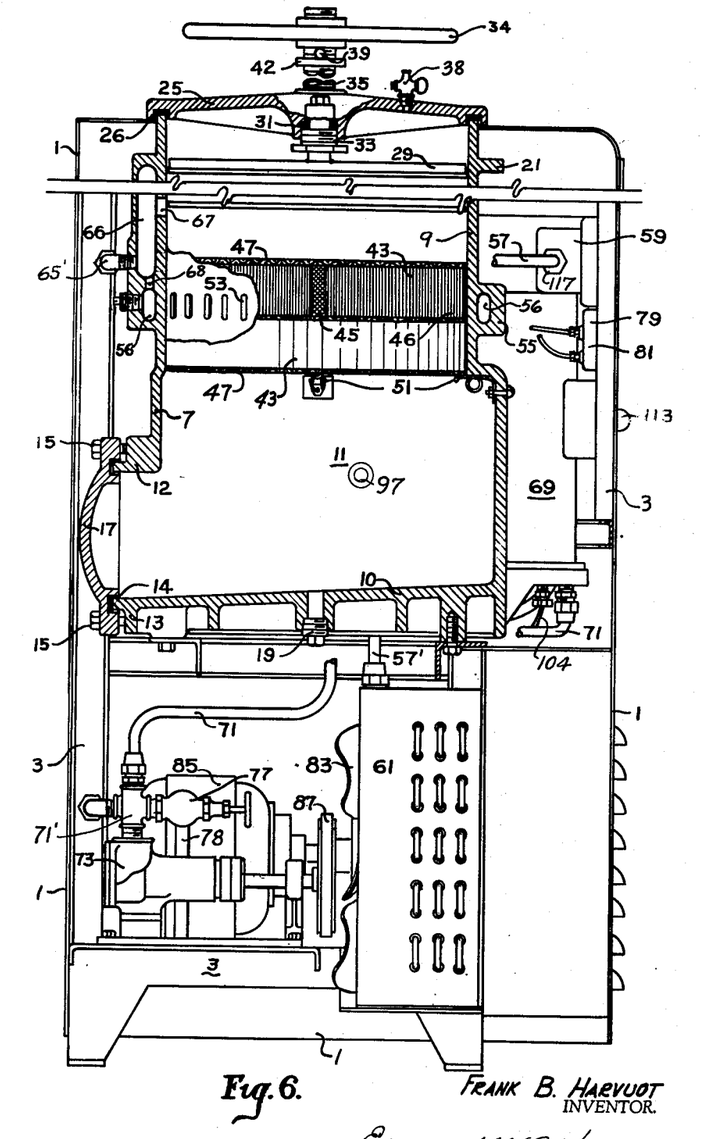
Figure 6 is similar to Figure 2, but taken partially in section to show the internal structure of the unit.

Referring now specifically to Figure 6, the internal structure of the filtration chamber and the filter elements will be described. The pressure plate 29 previously described is adapted to engage compressibly the uppermost of a plurality of filter elements 43 which are disposed one on top of another except for the intervening spacers 47. The lowermost element is supported by suitable springs 51 fastened to the wall of the sump and extending partially across the cylindrical portion. The springs support, to a very limited degree, the filter elements, against the action of the pressure plate 29 in compressed relation therewith, but any large pressure exerted by the pressure plate will overcome the spring supports and therefore eject the lowermost filter element into the sump 11.

The filter elements comprise a compressed cellulose rope core 45 and the main body 46 which consists of a roll of tightly and spirally wound cellulose paper (260 wraps per diametral inch). The single wrap or layer is comparable in composition, thickness, and quality to the commercial product known as "Kleenex." Spacer plates 47, preferably a single disc of 4 mesh screen, are placed between each pair of filter elements.

Elongated holes 53 are formed circumferentially around the sidewall of the chamber 9 in a position above the lowermost filter element 43.

Referring to Figures 1, 2 and 6, an outlet manifold 55 surrounds the exterior of the chamber 9 and has a channel 56 which spans the small holes 53 in the sidewall thereof.

A flow indicator 59 (Figs. 2, 3 and 6) to be described later, is disposed in a pipe 57, 57' (Fig. 2 and 3) which connects the manifold 55 to a heat exchanger or cooler 61, which is supported in the lower part of the frame 3. From the cooler the filtered liquid passes to the point of use or storage through a fitting 64' which is a part of the filtered liquid line to the discharge line 64.

A manually operated shut-off valve 65 is disposed in a second pipe 63 (Figs. 1 and 3) connecting the street L 63', which enters the sump, with the street L 65' which enters the channel 66 of the manifold 55. The manifold is thus connected with the sump 11 so that the filtrate remaining in the cylinder above the manifold when operation is stopped may be drained into the sump either through port 67 and channel 66 or through ports 53 and manifold 55. Also, when operation is stopped, the channel 66, which places the upper portion of the filter chamber in communication with the manifold through ports 67 and 68, allows equalization of pressure therebetween during operation and relieves the pressure when the valve 65 is opened as described above. The application of outlet pressure to the upper portion of the chamber assists in holding the filter elements down against the pump pressure. It is, of course, necessary to relieve this pressure when the plate 25 is to be removed to permit the insertion of additional filter elements.

Figure 7:
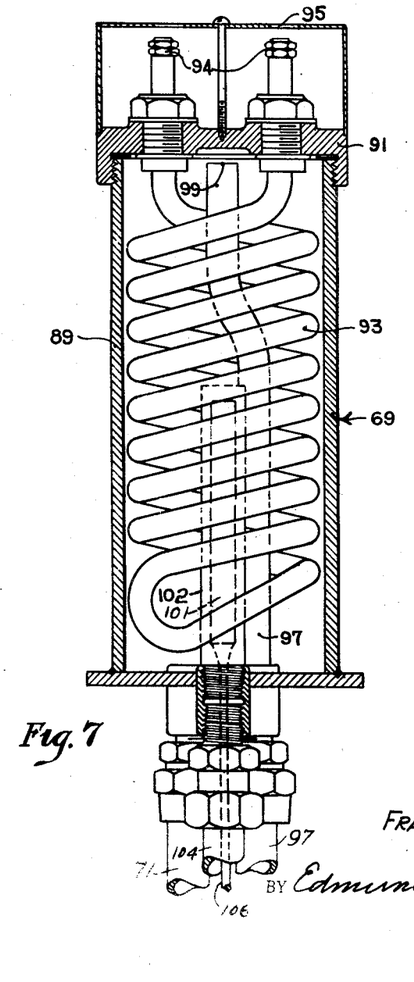
Figure 7 is a cut-away view showing the internal structure of the heating unit.

The tank of a thermostatically controlled heating unit, generally designated by the numeral 69, and shown in detail in Fig. 7, is supported on the cylindrical portion of the sump 11 and is provided with a suitable outlet line 97 (See Figs. 3 and 7) connecting it to the sump. A T 71' and a pipe 71 connect the inlet of the heating unit 69 with the outlet side of a pump 73 (see Figs. 1 and 2). Another pipe 75 (Figs. 2 and 3) connects the sump 11 directly to the T 75' connected to the inlet side of the pump 73 through an automatic pressure relief valve 80, and thus provides a by-pass line for unfiltered liquid, which by-passes the filter. A pressure gage 79 and a dial-type thermometer 81 are suitably connected to the sump. The numeral 74 (Fig. 1) designates the main inlet line to the pump 73 which has disposed therein a check valve 76 and is connected by T 75' to the suction side of the pump. A line 78 is provided with a valve 77 which is connected to the T 71' and thus connects the outlet side of the pump 73 to the inlet line 74 upstream of the check valve to provide a pump by-pass.

The fan 83 is driven directly by a motor 85 which also drives the pump 73 by means of a belt 87. The pump 73 and motor 85 are suitably bolted to the lower part of the frame 3.

Referring specifically to Figure 7, the heating unit 69 comprises a casing 89 of cylindrical cross-section. To the upper periphery of the casing 89 is screwed a cover 91 from which depend the "Calrod" or other electric heating coils 93 controlled by a switch 107. The terminals 94 of the coils are disposed without the cover 91 but within a cap 95 which is suitably fastened to the cover. The coils 93 when suspended within the casing 89, encompass the outlet pipe 97 which from its opening 99 adjacent to the cover 91, extends downwardly through the bottom of the casing 89 and thence to the sump 11. The inlet pipe 71 from the pump opens into the casing 89 near the bottom thereof thus necessitating complete liquid contact with the coils before passage into the outlet. Similarly disposed within the casing 89 and encompassed by the heating coils 93 and a cap 102 and tube 104, is the thermostatic liquid filled bulb or element 101 and its tube 106 in conduit 104, which controls switch 107 to energize or deenergize the heating coils in accordance with the temperature of the oil in the casing.

The element 101 being in the casing 89 is at substantially the same temperature as the oil therein. The bulb 101 is connected to any conventional liquid operated switch by the tube 106 so that expansion or contraction of the liquid will open and close the switch respectively.

Referring now to Figures 1, 3, 4 and 7, it will be seen that a manual switch 103 connects both the motor 85 and the heater 69, in parallel, to a 220 volt A. C. line 105. A switch 107, controlled by the thermostatic element 101, is provided for the heating unit 69, while control means 109 serve to automatically shut off the motor when a predetermined amount of overloading is encountered. This latter is preferably a common "Thermatron" resistance control element as manufactured by the Allen-Bradley Corporation. A green light 111 is connected in series with the manual switch 103 to signal when the unit is operating. A red lamp 113 in series with and controlled by a normally open switch 115, is actuated by flow indicator 59.

A flow indicator and switch operator similar to that shown in my Patent No. 2,388,843, issued November 13, 1945, for Slow Feed Indicator may be connected in the filtrate outlet line 57—57', as is clearly shown in Figures 2, 3 and 6. The inlet 117 is, of course, connected to pipe 57 while the outlet 145 is connected to the pipe 57'.

Figure 8:
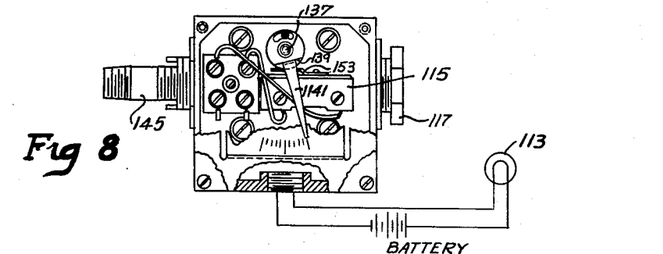
Figure 8 is a cut-away view of the flow sight indicator showing the pointer and the arrangement of the electrical components.
Figure 9:
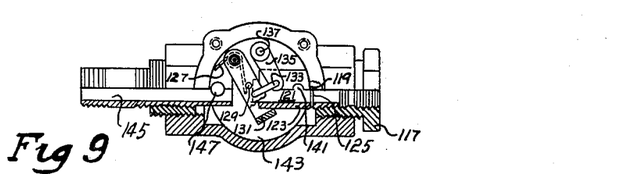
Figure 9 is a view of the flow sight of Figure 8 showing the arrangement of the liquid actuated elements.

As shown in Figs. 8 and 9, liquid flows into the indicator inlet 117 and into a tube 123 having a small hole 119 and a large hole 141. Part of the liquid may leak through the constantly open hole 119, but not in sufficient quantities to relieve pressure on a piston 121 disposed in the bore of the tube 123. The piston under pressure of the incoming liquid thus moves away from a pin 125 which passes diametrically across the tube and serves as a stop, and against the action of spring 127, which engages a pin 129 set in a bail 131 which is pivotally mounted, and moves pin 129 and bail 131 in a clockwise direction. This movement is transmitted by a link 133 to arm 135 and shaft 137, thence to a cam 139 and an indicator 141 mounted on and rotated by shaft 137. As the piston moves to the left, the indicator and switch closing cam reach a position at which a micro-switch lever 153, which rides on the cam, is released by the cam, whereupon the normally open (self-opening) switch 115 (see Fig. 4) is permitted to open. The liquid flows from the bore of tube 123 through one or more holes 141, which may be of any desirable size, into body 143 and out through tube 145. Holes 147 in tube 145 are provided as outlets from the body into tube 145 when piston 121 is adjacent the inlet end of tube 145. If flow is substantially stopped, the piston 121 is in its right-hand position, and the cam 139 will hold the switch lever 153 down, to thus hold the switch closed to energize the red lamp 113 to light, serving to indicate the cessation of flow to the operator.

Operation

In preparing to operate the filter, the cover 25 is removed, whereupon several filter units 43 with their accompanying spacers 47 are placed in the filtration chamber 9 so as to rest on the springs 51. The number of elements inserted in the filter may vary from a minimum of one to the capacity of the chamber 9 which depends upon the length thereof. The elements fit rather snugly in the bore. The pressure plate 29 is then inserted in the cylinder 9 after having been positioned adjacent the cover plate 25 and the cover plate 25 is bolted in sealing position. The hand wheel 34 is then turned to force the pressure plate 29 against the uppermost of the filter elements 43 thus compressing them against the springs 51, and the apparatus will be ready for operation.

After connecting the inlet 74 to a source of dirty oil and the outlet 64 to a receiver, the manual switch 103 is closed to energize the heating unit 69, green light 111, and the motor 85. The dirty oil will be drawn through inlet 74 and check valve 76 and pumped through conduit 71 into the heater 69 and thence by way of conduit 97 into the sump 11. Filtration will not proceed at the desired rate until the desired oil temperature and consequently the proper viscosity is reached, for at a lower temperature resistance to flow through the filter elements 43 will create enough pressure to open the pressure relief valve 80 which is preferably set at 75 p. s. i. The oil is thus recirculated through the by-pass valve 80, line 75, pump 73, the pump discharge line 71, the heater 69, the conduit 97 and sump 11, until the required filtration temperature is attained. The thermostatic switch 107 opens and closes to control the heater as required to maintain the filtering temperature whereat the oil viscosity is sufficiently reduced to enable it to pass through the filter elements 43.

The oil actually passes through only the lowermost unit 43 and a portion of the unit directly above, and thence outwardly through the holes 53 into the manifold 55 where it is collected. The greater portion of the impurities are retained on the surface of the first element 43. The impurities passing the surface are retained in the first element and the surface of the second element. Substantially edge-type filtration is achieved, but the liquid must also pass radially through at least part of the element to reach the outlet. The oil passes from the manifold through conduit 57, flow indicator 59, line 57', into the cooler 61, and out the discharge line 64 to storage.

When a sizeable decrease in flow rate occurs due to clogging of the foremost element 43, as will be disclosed by the flow indicator 59, the valve 77 in line 78 is opened, whereby the dirty oil is merely recirculated through the pump 73 and the pressure in the sump 11 is therefore relieved. The valve 65 in line 63 is opened to allow drainage of oil from above the elements in the filtration chamber into the sump through the continually open channel 66 and permits equalization of pressure on opposite sides of the filtering elements. The hand wheel 34 is turned far enough to cause the pressure plate 29 to eject the foremost element 43 and its spacer 47 into the sump 11, thereby presenting a new filter element and consequently a clean filter surface. It is thus apparent that the filtering operation is substantially uninterrupted.

Complete cessation of flow through the filter 7 relieves pressure on piston 121 and spring 127 and actuates shaft 137 of the flow indicator 59 to close the switch 115 which energizes the red light 113 to warn the operator of the condition.

If, for any reason, the motor 85 is subjected to a predetermined overload, (preferably 60% in the apparatus shown), the thermatron resistance control unit 93 stops the motor before any difficulty results to interrupt operation.

The filtrate is cooled by passage through the cooler 61 and emerges therefrom through conduit 64 at approximately room temperature. The fan continually forces air through the cooler 61. When the run is completed or the elements 43 are all ejected except one, operation is stopped by opening the main switch 103. The air release valve 38 in the cover plate 25 is opened, the manual valve 65 controlling flow from the manifold 55 to the sump 11 is opened, and the drain plug 19 is removed, thus allowing the liquid to drain out of the cylinder, manifold, channel and sump. The cover plate 17 may then be removed and the ejected filter elements 43 taken out. The operation may then be repeated. This, of course, requires putting new filter elements in place as described above.

It is obvious that various changes may be made in the form, structure and arrangement of parts without departing from the spirit of the invention. Accordingly applicant does not desire to be limited to the specific embodiment disclosed herein primarily for purposes of illustration, but instead he desires protection falling fairly within the scope of the appended claims.

What I claim to be new and desire to protect by Letters Patent of the United States is:

1. In a filtering apparatus, a source of liquid, a pump having a suction port in communication with said liquid source and an outlet port, a filtration chamber having an enlarged inlet portion connected to the outlet port of said pump, an outlet in said chamber, a plurality of filter elements releasably supported in said filtration chamber, manual means for ejecting said elements, one by one, into said inlet portion, a by-pass line connecting the inlet portion of said chamber with the suction port of said pump, and a manually operable valve in said line whereby liquid pressure in said chamber may be relieved while said ejecting means is operative.

2. In a filtering apparatus, a filtration chamber having one end open and communicating with an enlarged inlet tank and an outlet in the wall of said filtration chamber, a plurality of separate and independent filter elements stacked, one on the other, and mounted for sliding in said filtration chamber, means adjacent the open end of said filtration chamber for releasably supporting said filter elements in said chamber, means comprising a pressure plate mounted in the other end of said chamber and adapted to engage the filter element remote from said open end so as to eject the element adjacent the open end into the enlarged inlet tank, and manual means for actuating said plate.

3. In a filtering apparatus, a filtration chamber having one end open and communicating with an enlarged inlet tank and an outlet in the wall of said chamber, a plurality of filter elements stacked, one on the other, in said filtration chamber, means adjacent the open end of said chamber for releasably supporting the filter element adjacent the open end of said chamber, means comprising a pressure plate in the other end of said chamber adapted to engage the filter element adjacent said other end so as to eject the lowermost element into the enlarged inlet tank, manual means for actuating said plate, and means for locking said plate in position.

4. In a filtering apparatus a filtration chamber, a plurality of filter elements movably mounted in said chamber, a head for closing said chamber, means for ejecting the elements from said chamber comprising an actuating plate, a rod attached thereto and slidable through a seal in said head, a hollow screw mounted on said head to receive said rod, longitudinal slots in said screw, a pin mounted transversely in said rod and extending through said slots, and a hand wheel mounted on said screw and adapted to engage said pin for actuating said rod.

5. In a filtering apparatus, a filtration chamber having one end open, an inlet compartment of greater cross-sectional area than the filtration chamber connected thereto, a plurality of independent, separable filter elements disposed in end to end contact with each other and slidable in said chamber, means disposed at the juncture of said chamber and compartment for holding said elements in said chamber, said holding means being adapted to resistably yield toward said compartment in response to movement of said filter elements toward said compartment, an outlet in said chamber disposed intermediate the ends thereof and spaced from said holding means by at least the thickness of a filter element, means in the filtration chamber operable at will and disposed so as to urge said filter elements toward said holding means and serving to overcome said holding means to eject the lowermost element into said compartment.

6. In a filtering apparatus, a filtration chamber having an open end communicating with an enlarged inlet compartment, an outlet in the side of the filtration chamber, a plurality of separable, independent filter elements slidably mounted in said filtration chamber, said inlet chamber and outlet being so spaced as to have at least one of said elements disposed therebetween, means adjacent the open end of the filtration chamber for supporting said filter elements in said filtration chamber, said supporting means being constructed and arranged to resistingly yield to the movement of said elements toward said compartment, and means disposed in the other end of said filtration chamber and operable at will to force said elements toward said open end to overcome said supporting means whereby to eject said elements, one by one, into said compartment, said enlarged compartment having a lateral, normally closed opening to permit removal of the ejected elements therefrom.

7. In a filtering apparatus, a filtration chamber and magazine having a closed end and an open end serving as an inlet, an outlet spaced from said open end, said outlet comprising a plurality of radial holes disposed in the sidewall of said filtration chamber and enclosed by a circumferential manifold, a plurality of disc-like filter elements disposed in and transversely of said chamber, in face to face contact with each other, said inlet and outlet being spaced so that at least one element may be disposed between them, element displacing means mounted at the closed end of said chamber and comprising means for engaging the nearest element and means for moving said engaging means and element toward said inlet, the motion of said element being transmitted to the other elements by reason of said face to face contact to eject the element, adjacent the inlet, out of said chamber.

8. In a filtering apparatus, an open-ended filtration chamber, a plurality of separate and independent filter elements slidably mounted in said chamber, each element being in the form of a disc disposed transversely of the chamber and having face contact with the elements on either side of it, an inlet and an outlet in said chamber so spaced as to have at least one of said filter elements disposed therebetween, means for urging said elements toward the open end of said chamber, and means comprising a plurality of leaf springs fastened to the lower periphery of said chamber wall at said open end, said springs having free ends extending beneath the edge of the element nearest them whereby pressure applied to the element by said urging means will overcome pressure of the springs and cause the element to be moved past the springs.

FRANK B. HARVUOT.

REFERENCES CITED

The following references are of record in the file of this patent:

UNITED STATES PATENTS

| Number | Name | Date |
|---|---|---|
| 174,795 | Fogarty et al. | Mar. 14, 1876 |
| 1,367,325 | Probst | Feb. 1, 1921 |
| 1,642,864 | Williams | Sept. 20, 1927 |
| 1,743,122 | Eggert | Jan. 14, 1930 |
| 1,806,553 | Babitch | May 19, 1931 |
| 1,870,885 | Alsop | Aug. 9, 1932 |
| 2,065,658 | Compton | Dec. 29, 1936 |
| 2,068,394 | Burckhalter et al. | Jan. 19, 1937 |
| 2,068,395 | Burckhalter et al. | Jan. 19, 1937 |
| 2,103,572 | Wells | Dec. 28, 1937 |
| 2,110,009 | Weidenbacker | Mar. 1, 1938 |
| 2,178,930 | Crawford | Nov. 7, 1939 |
| 2,286,432 | Monsarrat | June 16, 1942 |
| 2,389,603 | Dollinger | Nov. 27, 1945 |

FOREIGN PATENTS

| Number | Country | Date |
|---|---|---|
| 9,953 | Great Britain | of 1898 |